(12) United States Patent
Sato et al.

(10) Patent No.: US 9,006,383 B2
(45) Date of Patent: *Apr. 14, 2015

(54) METHOD FOR PRODUCING COPOLYMER OF DIALLYLAMINE AND SULFUR DIOXIDE

(75) Inventors: Yusuke Sato, Fukushima (JP); Yusuke Fukushima, Fukushima (JP); Yasuhito Nakata, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/699,885

(22) PCT Filed: May 13, 2011

(86) PCT No.: PCT/JP2011/061605
§ 371 (c)(1),
(2), (4) Date: Mar. 1, 2013

(87) PCT Pub. No.: WO2011/148862
PCT Pub. Date: Dec. 1, 2011

(65) Prior Publication Data
US 2013/0172523 A1 Jul. 4, 2013

(30) Foreign Application Priority Data

May 26, 2010 (JP) ................. 2010-120146

(51) Int. Cl.
| | | |
|---|---|---|
| C08G 75/20 | (2006.01) | |
| C08G 75/00 | (2006.01) | |
| C08G 75/22 | (2006.01) | |

(52) U.S. Cl.
CPC ............... *C08G 75/00* (2013.01); *C08G 75/22* (2013.01)

(58) Field of Classification Search
USPC .......................................... 528/582, 383, 382
See application file for complete search history.

(56) References Cited

U.S. PATENT DOCUMENTS

2005/0070456 A1 * 3/2005 Aihara et al. ................. 510/499

FOREIGN PATENT DOCUMENTS

| JP | 45-343 | 1/1970 |
|---|---|---|
| JP | 2004-115675 | 4/2004 |
| JP | 2005-2196 | 1/2005 |
| JP | 2005-60491 | 3/2005 |
| JP | 2006-45363 | 2/2006 |
| JP | 2006-63228 | 3/2006 |
| JP | 2006-104360 | 4/2006 |
| JP | 2007-204507 | 8/2007 |
| JP | 2007-204597 | 8/2007 |
| JP | 2007-204599 | 8/2007 |
| JP | 2007-246838 | 9/2007 |
| JP | 2008-38077 | 2/2008 |

OTHER PUBLICATIONS

On-line informaion, pKa of 2-acrylamido-2-methyl propane sulfonic acid, 2012.*
International Search Report for PCT/JP2011/061605 mailed Aug. 9, 2011.
Written Opinion of the International Searching Authority mailed Aug. 9, 2011.

* cited by examiner

*Primary Examiner* — Shane Fang
(74) *Attorney, Agent, or Firm* — Nixon & Vanderhye P.C.

(57) ABSTRACT

Provided is a process for producing a copolymer of a diallylamine and sulfur dioxide which copolymer has a higher molecular weight and water-solubility than that obtained by a conventional production process by copolymerizing the diallylamine and sulfur dioxide in the presence of an acid and a radical polymerization initiator in a polar solvent.

5 Claims, 1 Drawing Sheet

METHOD FOR PRODUCING COPOLYMER OF DIALLYLAMINE AND SULFUR DIOXIDE

This application is the U.S. national phase of International Application No. PCT/JP2011/061605 filed 13 May 2011 which designated the U.S. and claims priority to JP 2010-120146 filed 26 May 2010, the entire contents of each of which are hereby incorporated by reference.

TECHNICAL FIELD

This invention relates to a process for producing a copolymer of a diallylamine and sulfur dioxide, and specifically, it relates to a process for producing a copolymer of a diallylamine and sulfur dioxide, which process enables the production of a copolymer having a higher molecular weight than any conventional process.

BACKGROUND ART

A copolymer of a diallylamine and sulfur dioxide can be produced at high yields by copolymerizing a diallylamine and sulfur dioxide in the presence of a radical polymerization initiator in a polar solvent (for example, see Patent Document 1 or 2). A copolymer of a diallylamine and sulfur dioxide obtained by the above production process is water-soluble, and its use in a variety of fields such as a water-soluble coating composition and an agent for improving the dye fastness of a dyed article is proposed (for example, see Patent Document 1).

PRIOR ART DOCUMENTS

Patent Documents

[Patent Document 1] JP 45-343B
[Patent Document 2] JP 2006-45363A

SUMMARY OF THE INVENTION

Problems to be Solved by the Invention

However, studies by the present inventors have revealed that the conventional production process described in Patent Document 1 generally can only produce a copolymer having a low molecular weight, and it has been difficult to produce a high-molecular-weight copolymer of a diallylamine and sulfur dioxide. Further, it has not been easy to control the molecular weight of a copolymer to be produced, on the basis of, or depending upon, the concentration of a monomer or the amount of a radical polymerization initiator added.

Under the circumstances, it is an object of this invention to provide a process for producing a copolymer of a diallylamine and sulfur dioxide, in which a copolymer having a higher molecular weight than any conventional processes, in particular, a copolymer having a higher molecular weight and having water solubility can be produced, and the molecular weight of the copolymer to be produced can be controlled.

Means to Solve the Problems

The present inventors have made diligent studies for achieving the above object, and as a result, it has been surprisingly found that in spite of an existing piece of knowledge that a low-molecular-weight polymer of monoallylamine hydrochloride is produced in the presence of an excess amount of hydrochloric acid (see JP 6-2780B), the molecular weight of a copolymer of a diallylamine and sulfur dioxide is increased by proceeding with the copolymerization reaction in the presence of an acid including hydrochloric acid as compared with a case where no acid is present. This invention has been accordingly completed.

This invention therefore provides a process for producing a copolymer of a diallylamine and sulfur dioxide, which process enables the production of a copolymer having a higher molecular weight than any conventional process and having water solubility, and includes the following inventions [1] to [5].

[1] A process for producing a copolymer of a diallylamine and sulfur dioxide, which comprises copolymerizing a diallylamine of the following general formula (I),

[CF1]

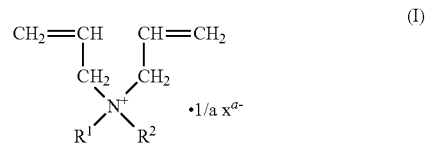

(wherein each of $R^1$ and $R^2$ is independently a hydrogen atom or an alkyl group having 1 to 4 carbon atoms, $X^{a-}$ represents a counter ion, and a represents a valence of the counter ion),
and sulfur dioxide in the presence of an acid and a radical polymerization initiator in a polar solvent.

[2] A process as recited in [1], which comprises mixing the diallylamine (I) and the acid in the polar solvent, then, mixing the resultant acidic solution of the diallylamine (I) with the sulfur dioxide, and copolymerizing the diallylamine (I) and the sulfur dioxide in the presence of the radical polymerization initiator in the resultant mixture solution.

[3] A process as recited in [1] or [2], wherein said acid is an acid having a pKa of 4.0 or less.

[4] A process as recited in any one of [1] to [3], wherein said diallylamine (I) is a diallylamine selected from the group consisting of diallyldimethylammonium chloride, diallylethylmethylammonium ethylsulfate, diallylmethylamine hydrochloride and diallylamine hydrochloride.

[5] A process as recited in any one of [1] to [4], wherein the obtained copolymer of the diallylamine (I) and sulfur dioxide has a molecular weight of 2,800 to 200,000.

Effect of the Invention

According to the process of this invention, there can be produced a copolymer of diallylamines and sulfur dioxide at high yields which copolymer has a higher molecular weight than that according to any conventional method and is water-soluble. Further, the molecular weight of the copolymer to be obtained can be controlled by selecting an acid that is used in the process of this invention and its amount.

EMBODIMENTS OF THE INVENTION

Figure 1:
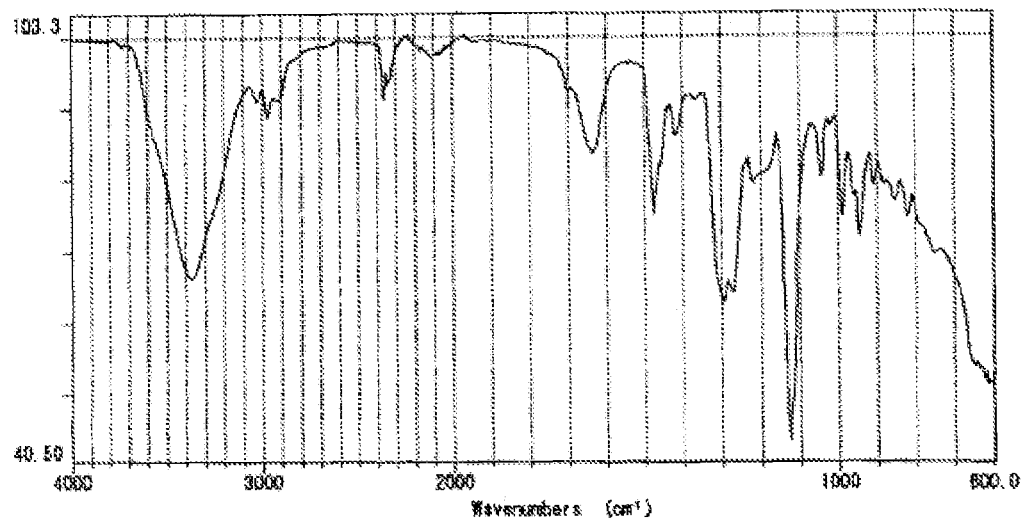
FIG. 1 is the showing of IR spectrum of a copolymer of diallyldimethylammonium chloride and sulfur dioxide, obtained in Example 1.

In the process for producing a copolymer of diallylamine and sulfur dioxide (to be sometimes described as "SO$_2$" in the present specification), the diallylamine for use as a raw material monomer is represented by the following general formula (I).

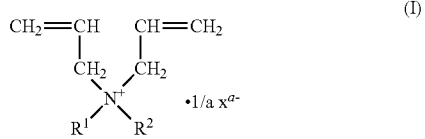

In the general formula (I), each of R$^1$ and R$^2$ is independently a hydrogen atom or an alkyl group having 1 to 4 carbon atoms. Examples of the alkyl group having 1 to 4 carbon atoms include methyl, ethyl, propyl and butyl, and the propyl and butyl may be any one of linear or branched groups. Further, X$^{a-}$ represents a counter ion, and examples thereof include chlorine ion, bromine ion, iodine ion, sulfate ion, carboxylate ion, dicarboxylate ion, phosphate ion, alkylsulfate ion, sulfamate ion and hydroxide ion. In addition, a represents a valence of the counter ion. When R$^1$ and/or R$^2$ are/is hydrogen atom(s) and X$^{a-}$ is a hydroxide ion, the diallylamine of the general formula (I) is a type of being ion-free.

The diallylamine for use in the process of this invention includes, for example, diallyldialkylammonium salt, diallylalkylamine salt and diallylamine salt.

Examples of the diallylalkylammonium salt include diallyldimethylammonium chloride, diallydimethylammonium bromide, diallyldimethylammonium iodide, diallydimethylammonium methyl sulfate, diallydimethylammonium ethyl sulfate, diallylethylmethylammonium chloride, diallylethylmethylammonium bromide, diallylethylmethylammonium iodide, diallylethylmethylammonium methyl sulfate, diallylethylmethylammonium ethyl sulfate, diallyldiethylammonium chloride, diallyldiethylammonium bromide, diallyldiethylammonium iodide, diallyldiethylammonium methyl sulfate, diallyldiethylammonium ethyl sulfate, diallylmethylpropylammonium chloride, diallylmethylpropylammonium, bromide, diallylmethylpropylammonium iodide, diallylmethylpropylammonium methyl sulfate, and diallylmethylpropylammonium ethyl sulfate.

The diallylalkylamine salt includes, for example, diallylmethylamine hydrochloride, diallylmethylamine hydrobromate, diallylmethylamine hydroiodate, diallylmethylamine sulfate, diallylmethylamine methanesulfonate, diallylethylamine hydrochloride, diallylethylamine hydrobromate, diallylethylamine hydroiodate, diallylethylamine sulfate, diallylethylamine methanesulfonate, diallylpropylamine hydrochloride, diallylpropylamine hydrobromate, diallylpropylamine hydroiodate, diallylpropylamine sulfate and diallylpropylamine methanesulfonate.

The diallylamine salt includes diallylamine hydrochloride, diallylamine hydrobromate, diallylamine hydroiodate, diallylamine sulfate and diallylamine methanesulfonate.

Of these, diallyldimethylammonium chloride (to be sometimes referred to as "DADMAC" hereinafter in the present specification), diallylethylmethylammonium ethyl sulfate (to be sometimes referred to as "DAEMAES" hereinafter in the present specification), diallylmethylamine hydrochloride (to be sometimes referred to as "DANA-HCl" hereinafter in the present specification) or diallylamine hydrochloride (to be sometimes referred to as "DAA-HCl" hereinafter in the present specification) are preferred since they are versatile and easily produced.

These may be used singly or may be used in combination of the two or more of them.

In the process of this invention, the concentration of total monomer amount of the diallylamine and sulfur dioxide in a reaction solution is suitably 40.00 to 80.00 mass %, preferably 45.00 to 78.00 mass %, more preferably 50.00 to 76.00 mass %, still more preferably 55.00 to 74.00 mass %, particularly preferably 60.00 to 72.00 mass %.

In the process of this invention, the charged monomer molar ratio of diallylamine/sulfur dioxide is normally 0.5/0.5 or more from the viewpoint of stability of a copolymer to be obtained, and it is preferably 0.5/0.5 to 0.95/0.05, more preferably 0.5/0.5 to 0.8/0.2, still more preferably 0.5/0.5 to 0.6/0.4, particularly preferably 0.5 to 0.5.

The acid for use in the process of this invention may be any one of an organic acid and an inorganic acid, and for example, it is an acid having a pKa of 4.0 or less, preferably an acid having a pKa of 2.0 or less, more preferably an acid having a pKa of 1.0 or less, still more preferably an acid having a pKa of −0.5 or less, particularly preferably an acid having a pKa of −2.5 or less. As the pKa value of an acid used becomes smaller, the molecular weight of the copolymer of diallylamine and sulfur dioxide, obtained in the process of this invention, tends to increase.

The above pKa represents an ionization index of an acid, and it is an equilibrium constant that is different depending upon temperatures and ionic strengths.

As a pKa value of an acid for use in the process of this invention, pKa values described in "KAGAKU BINRAN" (Chemical Reference Book), Basic Edition, 5th Revised Edition (Maruzen Co., Ltd.) can be used. When "KAGAKU BINRAN" (Chemical Reference Book), Basic Edition, 5th Revised Edition (Maruzen Co., Ltd.) describes a plurality of values depending upon solvents or temperatures, the pKa value of an acid shall represent a pKa value in water at 25° C. When it also describes different values depending upon ionic strengths in addition to solvents and liquid temperatures, the pKa value of an acid shall represent a pKa value in an aqueous solution having an ionic strength of 0.1 mol/l at 25° C.

Further, when "KAGAKU BINRAN" (Chemical Reference Book), Basic Edition, 5th Revised Edition (Maruzen Co., Ltd.) describes no pKa value, the pKa value of an acid can be determined by preparing an aqueous solution having an ionic strength adjusted to 0.1 mol/l with nitrogen-purged ultrapure water at 25° C. and measuring this solution for a pKa value with a potentiometric titration apparatus such as AT-510 supplied by KYOTO ELECTRONICS MANUFACTURING CO., LTD.

When a polyhydric acid is used as an acid for use in the process of this invention, the pKa value thereof shall mean a pKa (pKa1) in a dissociative reaction at a first stage.

Examples of the acid for use in the process of this invention include hydrochloric acid, hydrobromic acid, hydroiodic acid, hydrofluoric acid, chlorosulfuric acid, fluorosulfuric acid, amidosulfuric acid, sulfuric acid, phosphoric acid, perchloric acid, methanesulfonic acid, ethanesulfonic acid, propanesulfonic acid, benzenesulfonic acid, toluenesulfonic acid, naphthalenesulfonic acid, naphthalenedisulfonic acid, trifluoroacetic acid, trichloroacetic acid and hydroxyacetic acid. Of these, hydrochloric acid or sulfuric acid is preferred since a high-molecular-weight copolymer of a diallylamine and sulfur dioxide can be obtained.

The amount of an acid to be used in the process of this invention is 4 to 48 mol %, for example, based on a total molar amount of all of monomers, and it is preferably 5 to 40 mol %, more preferably 6 to 35 mol %, still more preferably 7 to 33 mol %, particularly preferably 8 to 32 mol %.

When an acid and the reaction solution are mixed in the process of this invention, the diallylamine and the acid may be mixed with each other in the polar solvent before the sulfur dioxide is mixed, or the reaction solution and the acid may be mixed with each other after the diallylamine and the sulfur dioxide are mixed in the polar solvent. From the viewpoint of easiness of production procedures, it is preferred to mix the reaction solution with sulfur dioxide after the diallylamine salt is mixed with the acid in the polar solvent.

In the process of this invention, the acidic solution of diallylamine obtained by mixing the diallylamine and the acid in the polar solvent has a pH, for example, of 3.30 or less, and the pH thereof is preferably 2.00 or less, more preferably 1.35 or less, still more preferably 0.80 or less, particularly preferably 0.40 or less. In particular, when the diallylamine solution has a pH of 4.00 or less before the diallylamine and the acid are mixed with each other, the pH of the acidic solution of diallylamine is preferably 1.35 or less, more preferably 1.00 or less, still more preferably 0.80 or less, particularly preferably 0.40 or less.

The pH value in this invention refers to a value measured under the conditions of 25° C. with a pH meter, for example, a pH meter F-22 supplied by HORIBA, Ltd.

The radical polymerization initiator for use in the process of this invention includes organic peroxides such as tert-butyl hydroperoxide and cumene hydroperoxide, aliphatic azo compounds such as 2,2'-azobisisobutyronitrile, inorganic peroxides such as ammonium persulfate and potassium persulfate, and nitrates such as ammonium nitrate and potassium nitrate. Further, it also includes gas containing oxygen such as air, radioactive ray, ultraviolet light and visible light.

In the process of this invention, the amount and use method of the radical polymerization initiator are not specially limited. For example, 1 to 3 mass %, based on the total mass of the monomers, of the radical polymerization initiator, or 0.1 to 0.3 mol %, based on the total molar amount of the monomers, of the radical polymerization initiator can be added to the reaction solution.

Examples of the polar solvent for use in the process of this invention include water, methanol, ethanol, dimethyl sulfoxide (DMSO), dimethylformamide (DMF), dimethylacetamide (DMA). As a solvent for the polymerization reaction, water is particularly preferred from the viewpoint of the reactivity of polymerization and safety.

In the process of this invention, generally, the radical polymerization initiator is added to the polar solvent containing the diallylamine, sulfur dioxide and acid, and the polymerization is carried out by stirring the resultant solution as required at room temperature or under the conditions of heating, whereby a solution of the copolymer of diallylamine and sulfur dioxide is obtained. The polymerization temperature is preferably −100° C. to 80° C., more preferably 5° C. to 50° C. Further, the polymerization time period is preferably 1 to 100 hours.

The acid remaining in a solution of the copolymer of diallylamine and sulfur dioxide after the reaction can be removed by neutralization treatment and centrifugal separation of a salt formed by the neutralization treatment or through the electrodialysis treatment with an ion-exchange membrane.

After completion of the reaction, the copolymer of diallylamine and sulfur dioxide can be re-precipitated by adding a solvent that does not dissolve the copolymer, such as an alcohol or acetone, and it can be recovered by filtering.

The copolymer of diallylamine and sulfur dioxide is a copolymer containing a diallylamine constituent unit of the following general formula (II) or (III),

[CF3]

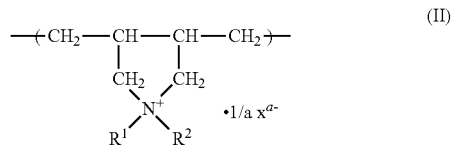

(II)

[CF4]

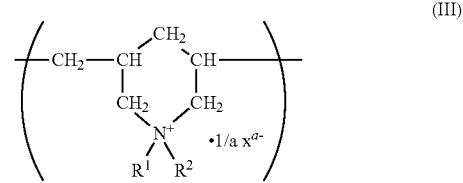

(III)

wherein each of $R^1$ and $R^2$ is independently a hydrogen atom or an alkyl group having 1 to 4 carbon atoms, $X^{a-}$ represents a counter ion, and a represents a valence of the counter ion, and a sulfur dioxide constituent unit of the following formula (IV).

[CF4]

(IV)

When the monomer molar ratio of the diallylamine/sulfur dioxide is 0.5/0.5, it is considered that the copolymer becomes a copolymer that alternately contains the above two constituent units.

The copolymer of diallylamine and sulfur dioxide obtained by the process of this invention has a molecular weight in the range of 2,800 to 200,000 as a weight average molecular weight of a polyethylene glycol measured according to a gel permeation chromatography (GPC) method, and it is preferably in the range of 3,500 to 100,000, more preferably in the range of 4,000 to 80,000, still more preferably in the range of 6,000 to 60,000, particularly preferably in the range of 6,500 to 50,000.

In the copolymer of diallylamine and sulfur dioxide obtained by the process of this invention, the copolymerization ratio of the diallylamine constituent unit and sulfur dioxide constituent unit (diallylamine constituent unit:sulfur dioxide constituent unit) is (0.05-20):1, and it is preferably (0.1-10):1, more preferably (0.2-5):1, still more preferably (0.4-2.5):1, particularly preferably (0.6-1.5):1.

In particular, in the copolymer of diallylamine hydrochloride (diallyldimethylammonium chloride, diallylmethylamine hydrochloride, diallylamine hydrochloride, etc.) and sulfur dioxide, the copolymerization ratio of the diallylamine hydrochloride and sulfur dioxide (diallylamine hydrochloride constituent unit:sulfur dioxide constituent unit) is preferably (0.65-1.2):1, more preferably (0.7-1.1):1, when calculated from the concentration ratio of chlorine ion and sulfur ion in the copolymer.

EXAMPLES

First, the methods of measuring copolymers obtained in Examples and Comparative Examples for weight average molecular weights, polymerization yields, polymerization ratios of DADMAC and $SO_2$ and pHs are as follows.

(i) Weight Average Molecular Weight of Copolymer

A copolymer was measured for a weight average molecular weight (Mw) by gel permeation chromatography (GPC method) using a Hitachi L-6000 high-performance liquid chromatograph. A Hitachi L-6000 was used as an eluant line pump, a Shodex RI-101 differential refractive index detector was used as a detector, and a water-base gel filtration type GS-220HQ column (exclusion limit molecular weight 3,000) and a GS-620HQ (exclusion limit molecular weight 2,000,000) column of Shodex Asahi Pack which were connected in series were used as a column. A sample having a concentration of 0.5 g/100 ml was prepared using an eluant, and 20 μl of the resultant solution was used. A 0.4 mol/liter sodium chloride aqueous solution was used as an eluant. The measurement was made at a column temperature of 30° C. at a flow speed of 1.0 ml/minute. A calibration curve was determined using, as a reference material, polyethylene glycols having molecular weights of 106, 194, 440, 600, 1,470, 4,100, 7,100, 10,300, 12,600, 23,000, etc., and on the basis of the calibration curve, the weight average molecular weight (Mw) of a copolymer was determined.

(ii) Polymerization Yield of Copolymer

It was determined on the basis of a peak area ratio obtained by the GPC method.

(iii) Copolymerization Ratio of Copolymer of DADMAC and $SO_2$

A copolymer solution of DADMAC and $SO_2$ was purified by re-precipitation thereof in methanol, and the resultant re-precipitate was filtered through a glass filter and then dried with a vacuum dryer for 1 hour to give a white crystal. The thus-obtained crystal was dissolved in water to prepare a 1% solution, and it was measured for a chlorine ion concentration and a sulfur ion concentration through an ion chromatography with a combustion type pre-treatment unit. A copolymerization ratio was determined on the basis of the measured chlorine ion concentration and sulfur ion concentration.

(iv) Method for pH Measurement pH measurements were made with a pH meter (supplied by HORIBA, Ltd.) under room temperature conditions (23±5° C.).

Methods for synthesis of copolymers of DADMAC (diallyldimethylammonium chloride) and $SO_2$ will be shown as Examples 1 to 7 and Comparative Example 1.

Acids used in Examples 1 to 7 had a pKa of 4.0 or less.

Example 1

A 300 ml separable flask equipped with a stirrer, a thermometer and a cooling tube was charged with 198.99 g of a 65 wt % DADMAC solution (equivalent to 0.080 mol of DADMAC) and 16.67 g of 35 wt % hydrochloric acid (equivalent to 0.16 mol of hydrochloric acid; 10 mol % based on the total molar amount of entire monomers), and they were homogeneously stirred.

Then, the mixture was cooled to 20° C. or lower, and then 51.25 g of $SO_2$ (equivalent to 0.80 mol of $SO_2$) was added, and a uniform solution was formed.

Then, 7.60 g of a 28.5% APS (ammonium persulfate) aqueous solution (APS amount equivalent to 1.2 wt % based on the total mass amount of entire monomers) was added, and copolymerization was carried out to give a copolymer of DADMAC and $SO_2$ in the form of an aqueous solution.

The pKa of hydrochloric acid was −3.7 ("KAGAKU BINRAN" (Chemical Reference Book), Basic Edition, 5th Revised Edition, Maruzen Co., Ltd.).

Example 2

A copolymer of DADMAC and $SO_2$ was obtained in the form of an aqueous solution in the same manner as in Example 1 except that 16.67 g of the 35 wt % hydrochloric acid was replaced with 33.33 g of 35 wt % hydrochloric acid (equivalent to 0.32 mol of hydrochloric acid; 20 mol % based on the total molar amount of entire monomers).

Example 3

A copolymer of DADMAC and $SO_2$ was obtained in the form of an aqueous solution in the same manner as in Example 1 except that 16.67 g of the 35 wt % hydrochloric acid was replaced with 50.00 g of 35 wt % hydrochloric acid (equivalent to 0.48 mol of hydrochloric acid; 30 mol % based on the total molar amount of entire monomers).

Example 4

A copolymer of DADMAC and $SO_2$ was obtained in the form of an aqueous solution in the same manner as in Example 1 except that 16.67 g of the 35 wt % hydrochloric acid was replaced with 16.52 g of 95 wt % sulfuric acid (equivalent to 0.16 mol of sulfuric acid; 10 mol % based on the total molar amount of entire monomers).

The pKa of sulfuric acid was −3.0 (Kolthoff, Treatise on Analytical Chemistry, New York, Interscience Encyclopedia, Inc., 1959).

Example 5

A copolymer of DADMAC and $SO_2$ was obtained in the form of an aqueous solution in the same manner as in Example 1 except that 16.67 g of the 35 wt % hydrochloric acid was replaced with 15.53 g of 99 wt % methanesulfonic acid (equivalent to 0.16 mol of methanesulfonic acid; 10 mol % based on the total molar amount of entire monomers).

The pKa of methanesulfonic acid was −0.6 (Brownstein, S.; Stillman, A. E. J.P.C. 1959, 63, 2061).

Example 6

A copolymer of DADMAC and $SO_2$ was obtained in the form of an aqueous solution in the same manner as in Example 1 except that 16.67 g of the 35 wt % hydrochloric acid was replaced with 16.18 g of 97 wt % amidosulfuric acid (equivalent to 0.16 mol of amidosulfuric acid; 10 mol % based on the total molar amount of entire monomers).

The pKa of amidosulfuric acid was 0.99 ("KAGAKU BINRAN" (Chemical Reference Book), Basic Edition, 5th Revised Edition, Maruzen Co., Ltd.).

Example 7

A copolymer of DADMAC and $SO_2$ was obtained in the form of an aqueous solution in the same manner as in Example 1 except that 16.67 g of the 35 wt % hydrochloric acid was replaced with 15.21 g of 70 wt % glycolic acid (equivalent to 0.16 mol of glycolic acid; 10 mol % based on the total molar amount of entire monomers).

The pKa of glycolic acid was 3.65 ("KAGAKU BINRAN" (Chemical Reference Book), Basic Edition, 5th Revised Edition, Maruzen Co., Ltd.).

Comparative Example 1

A copolymer of DADMAC and SO$_2$ in the form of an aqueous solution was obtained in the same manner as in Example 1 except that 16.67 g of the 35% hydrochloric acid was replaced with 16.67 g of water.

Figure 2:
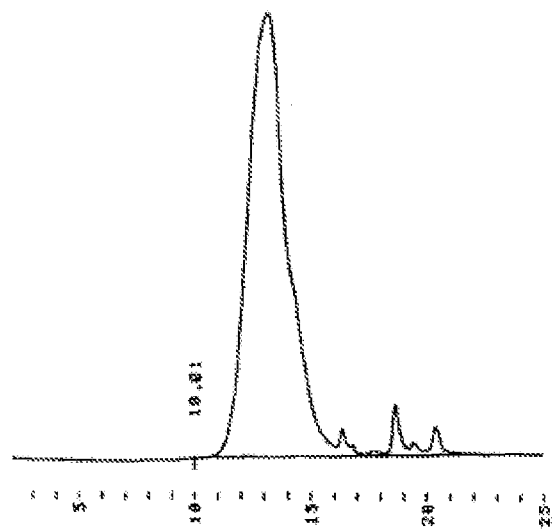
FIG. 2 is the showing of GPC chart of a copolymer of diallyldimethylammonium chloride and sulfur dioxide, obtained in Example 1.

FIG. 1 shows the IR spectrum of the copolymer of DADMAC and SO$_2$ obtained in Example 1, and FIG. 2 shows the GPC chart thereof. With regard to the IR spectrum, part of the solution obtained was re-precipitated in acetone, the resultant white solid was recovered by filtering and vacuum-dried at 50° C. for 48 hours to give a copolymer in the form of a white powder, and the white powder was measured for IR spectrum.

In FIG. 1, absorptions caused by —SO$_2$— were observed at/around 1,120 cm$^{-1}$ and 1,300 cm$^{-1}$, which supports that the copolymer obtained was a copolymer of DADMAC and SO$_2$.

Further, Table 1 shows conditions for producing copolymers of DADMAC and SO$_2$ obtained in Examples 1 to 7 and Comparative Example 1, and weight average molecular weights, polymerization yields and copolymerization ratios thereof. In Table 1, a DADMAC solution pH after an acid was mixed stands for a pH of a DADMAC solution after the DADMAC solution was mixed with an acid and before SO$_2$ was introduced, and that in Comparative Example 1 stands for a pH of a DADMAC solution which was mixed with no acid.

As shown in Table 1, it has been confirmed that the molecular weight of an obtained copolymer of DADMAC and SO$_2$ is increased by mixing a DADMAC solution with an acid as compared with a case where it is mixed with no acid. Further, it has been also confirmed that the molecular weight of a copolymer to be obtained can be controlled by selecting an amount and kind of an acid.

It has been also confirmed that the copolymers obtained are close to a copolymer having a DADMAC and SO$_2$ molar ratio of 1:1.

Example 8

A 300 ml separable flask equipped with a stirrer, a thermometer and a cooling tube was charged with 191.42 g of a 69.32 wt % DAEMAES solution (equivalent to 0.50 mol of DAEMAES; synthesized according to a method in JP 2006-45363A) and 10.42 g of 35 wt % hydrochloric acid (equivalent to 0.10 mol of hydrochloric acid; 10 mol % based on the total molar amount of entire monomers), and they were homogeneously stirred.

Then, the mixture was cooled to 20° C. or lower, and then 32.03 g of SO$_2$ (equivalent to 0.50 mol of SO$_2$) was added, and a uniform solution was formed.

Then, 7.60 g of a 28.5% APS aqueous solution (APS amount equivalent to 1.2 wt % based on the total molar amount of entire monomers) was added, and copolymerization was carried out to give a copolymer of DAEMAES and SO$_2$ in the form of an aqueous solution.

Example 9

A copolymer of DAEMAES and SO$_2$ was obtained in the form of an aqueous solution in the same manner as in Example 1 except that 10.42 g of the 35 wt % hydrochloric acid was replaced with 10.33 g of 95 wt % sulfuric acid (equivalent to 0.10 mol of sulfuric acid; 10 mol % based on the total molar amount of entire monomers).

Comparative Example 2

A copolymer of DAEMAES and SO$_2$ was obtained in the form of an aqueous solution in the same manner as in Example 8 except that 10.42 g of the 35 wt % hydrochloric acid was replaced with 10.42 g of water.

TABLE 1

| | Monomer concentration (DADMAC + SO$_2$; wt %) | Acid to be mixed | Amount of acid mixed (mol %) | DADMAC solution pH after acid was mixed | Molecular Weight | Yield (%) | Copolymerization ratio [DADMAC:SO$_2$] |
|---|---|---|---|---|---|---|---|
| Ex. 1 | 67.66 | Hydrochloric acid | 10 | 0.72 | 16000 | 97 | 0.80:1.00 |
| Ex. 2 | 63.68 | Hydrochloric acid | 20 | 0.36 | 17000 | 92 | 1.03:1.00 |
| Ex. 3 | 60.15 | Hydrochloric acid | 30 | 0.25 | 40000 | 92 | 1.06:1.00 |
| Ex. 4 | 67.70 | Sulfuric acid | 10 | 0.51 | 14000 | 97 | 0.75:1.00 |
| Ex. 5 | 67.99 | Methanesulfonic acid | 10 | 0.71 | 7200 | 95 | 0.70:1.00 |
| Ex. 6 | 67.79 | Amidosulfonic acid | 10 | 1.59 | 3800 | 95 | 0.80:1.00 |
| Ex. 7 | 67.48 | Glycolic acid | 10 | 3.10 | 4100 | 94 | 0.78:1.00 |
| CEX. 1 | 67.66 | — | — | (6.80) | 2500 | 94 | 0.73:1.00 |

Ex. = Example, CEx. = Comparative Example

Methods for synthesizing copolymers of DAEMAES (diallylethylmethylammonium ethylsulfate) and SO$_2$ will be shown below as Examples 8-9 and Comparative Example 2.

Acids used in Examples 8 and 9 were acids having a pKa of 4.0 or less.

Table 2 shows conditions for producing copolymers of DAEMAES and SO$_2$ obtained in Examples 8 and 9 and Comparative Example 2, and weight average molecular weights, polymerization yields and copolymerization ratios thereof. In Table 2, a DAEMAES solution pH after an acid was mixed stands for a pH of a DAEMAES solution after the DAEMAES solution was mixed with an acid and before $SO_2$ was introduced, and that in Comparative Example 2 stands for a pH of a DAEMAES solution which was mixed with no acid.

As shown in Table 2, it has been confirmed that the molecular weight of an obtained copolymer of DAEMAES and $SO_2$ is increased by mixing a DAEMAES solution with an acid as compared with a case where it is mixed with no acid.

TABLE 2

| | Monomer concentration (DAEMAES + $SO_2$; wt %) | Acid to be mixed | Amount of acid mixed (mol %) | DAEMAES solution pH after acid was mixed | Molecular weight | Yield (%) |
|---|---|---|---|---|---|---|
| Ex. 8 | 70.43 | Hydrochloric acid | 10 | 1.20 | 7000 | 92 |
| Ex. 9 | 70.46 | Sulfuric acid | 10 | 1.30 | 6700 | 97 |
| CEx. 2 | 70.43 | — | — | (3.45) | 1700 | 96 |

Ex. = Example, CEx. = Comparative Example

Methods for synthesizing copolymers of DAMA-HCl (diallylmethylamine hydrochloride) and $SO_2$ will be shown below as Example 10 and Comparative Example 3.

An acid used in Example 10 was an acid having a pKa of 4.0 or less.

Example 10

A 300 ml separable flask equipped with a stirrer, a thermometer and a cooling tube was charged with 173.32 g of a 68.15 wt % DAMA-HCl solution (equivalent to 0.80 mol of DAMA-HCl), 16.67 g of 35 wt % hydrochloric acid (equivalent to 0.16 mol % of hydrochloric acid; 10 mol % based on the total molar amount of entire monomers) and 41.04 g of diluting water, and they were homogeneously stirred.

Then, the mixture was cooled to 20° C. or lower, and then 51.25 g of $SO_2$ (equivalent to 0.8 mol of $SO_2$) was added, and a uniform solution was formed.

Then, 1.92 g of a 28.5% APS aqueous solution (APS equivalent to 0.15 mol % based on the total molar amount of entire monomers) was added, and copolymerization was carried out to give a copolymer of DAMA-HCl and $SO_2$ in the form of an aqueous solution.

Comparative Example 3

A copolymer of DAMA-HCl and $SO_2$ was obtained in the form of an aqueous solution in the same manner as in Example 10 except that 16.67 g of 35 wt % hydrochloric acid was replaced with 16.67 g of water.

Table 3 shows conditions for producing copolymers of DAMA-HCl and $SO_2$ obtained in Example 10 and Comparative Example 3, and weight average molecular weights, polymerization yields and copolymerization ratios thereof. In Table 3, a DAMA-HCl solution pH after an acid was mixed stands for a pH of a DAMA-HCl solution after the DAMA-HCl solution was mixed with an acid and before $SO_2$ was introduced, and that in Comparative Example 3 stands for a pH of a DAMA-HCl solution which was mixed with no acid.

As shown in Table 3, it has been confirmed that the molecular weight of an obtained copolymer of DAMA-HCl and $SO_2$ is increased by mixing a DAMA-HCl solution with an acid as compared with a case where it is mixed with no acid.

TABLE 3

| | Monomer concentration (DAMA-HCl + $SO_2$; wt %) | Acid to be mixed | Amount of acid mixed (mol %) | DAMA-HCl solution pH after acid was mixed | Molecular weight | Yield (%) |
|---|---|---|---|---|---|---|
| Ex. 10 | 60.00 | Hydrochloric acid | 10 | 0.92 | 8600 | 99 |
| CEx. 3 | 60.00 | — | — | (3.40) | 2600 | 94 |

Ex. = Example, CEx. = Comparative Example

Methods for synthesizing copolymers of DAA-HCl (diallylamine hydrochloride) and $SO_2$ will be shown below as Example 11 and Comparative Example 4.

An acid used in Example 11 was an acid having a pKa of 4.0 or less.

Example 11

A 300 ml separable flask equipped with a stirrer, a thermometer and a cooling tube was charged with 130.10 g of a 66.76 wt % DAA-HCl solution (equivalent to 0.65 mol of DAA-HCl), 13.55 g of 35 wt % hydrochloric acid (equivalent to 0.13 mol % of hydrochloric acid; 10 mol % based on the total molar amount of entire monomers) and 28.87 g of diluting water, and they were homogeneously stirred.

Then, the mixture was cooled to 20° C. or lower, and then 41.64 g of $SO_2$ (equivalent to 0.65 mol of $SO_2$) was added, and a uniform solution was formed.

Then, 2.08 g of a 28.5% APS aqueous solution (APS equivalent to 0.2 mol % based on the total molar amount of entire monomers) was added, and copolymerization was carried out to give a copolymer of DAA-HCl and $SO_2$ in the form of an aqueous solution.

Comparative Example 4

A copolymer of DAA-HCl and $SO_2$ was obtained in the form of an aqueous solution in the same manner as in Example 11 except that 13.55 g of 35 wt % hydrochloric acid was replaced with 13.55 g of water.

Table 4 shows conditions for producing copolymers of DAA-HCl and $SO_2$ obtained in Example 11 and Comparative Example 4, and weight average molecular weights, polymerization yields and copolymerization ratios thereof. In Table 4, a DAA-HCl solution pH after an acid was mixed stands for a pH of a DAA-HCl solution after the DAA-HCl solution was mixed with an acid and before $SO_2$ was introduced, and that in Comparative Example 4 stands for a pH of a DAA-HCl solution which was mixed with no acid.

As shown in Table 4, it has been confirmed that the molecular weight of an obtained copolymer of DAA-HCl and $SO_2$ is increased by mixing a DAA-HCl solution with an acid as compared with a case where it is mixed with no acid.

TABLE 4

| | Monomer concentration (DAA-HCl + SO$_2$; wt %) | Acid to be mixed | Amount of acid mixed (mol %) | DAA-HCl solution pH after acid was mixed | Molecular weight | Yield (%) |
|---|---|---|---|---|---|---|
| Ex. 11 | 60.00 | Hydrochloric acid | 10 | 0.90 | 8100 | 96 |
| CEx. 4 | 60.00 | — | — | (3.45) | 1700 | 94 |

Ex. = Example, CEx. = Comparative Example

INDUSTRIAL UTILITY

According to this invention, there can be obtained a copolymer of a diallylamine and sulfur dioxide which copolymer has a high molecular weight and has water-solubility. Owing to an increase in molecular weight, the metal affinity and viscosity of the copolymer are increased, and it can be expected that the copolymer obtained in this invention is used as a fixing agent for inks. In recent years, further, acidic inhibitors having high molecular weights are demanded in various fields of use, and the copolymer obtained in this invention can comply with these demands.

The invention claimed is:

1. A process for producing a copolymer of a diallylamine and sulfur dioxide, which comprises copolymerizing a monomer mixture consisting of a diallylamine of the following general formula (I),

[CF1]

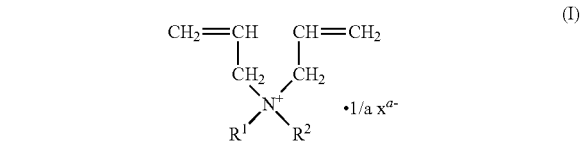

wherein each of R$^1$ and R$^2$ is independently a hydrogen atom or an alkyl group having 1 to 4 carbon atoms, X$^{a-}$ represents a counter ion, and a represents a valence of the counter ion, and sulfur dioxide in the presence of a polymerization accelerator which is at least one acid selected from the group consisting of hydrochloric acid, hydrobromic acid, hydroiodic acid, hydrofluoric acid, chlorosulfuric acid, fluorosulfuric acid, amidosulfuric acid, sulfuric acid, phosphoric acid, perchloric acid, methanesulfonic acid, ethanesulfonic acid, propanesulfonic acid, trifluoroacetic acid, trichloroacetic acid, hydroxyacetic acid and glycolic acid in an amount of 4 to 48 mol % based on the total molar amount of all monomers and a radical polymerization initiator in a polar solvent.

2. The process as recited in claim 1, which comprises mixing the diallylamine (I) and the acid in the polar solvent, then, mixing the resultant acidic solution of the diallylamine (I) with the sulfur dioxide, and copolymerizing the diallylamine (I) and the sulfur dioxide in the presence of the radical polymerization initiator in the resultant mixture solution.

3. The process as recited in claim 1, wherein said acid is an acid having a pKa of 4.0 or less.

4. The process as recited in claim 1, wherein said diallylamine (I) is a diallylamine selected from the group consisting of diallyldimethylammonium chloride, diallylethylmethylammonium ethylsulfate, diallylmethylamine hydrochloride and diallylamine hydrochloride.

5. The process as recited in claim 1, wherein the obtained copolymer of the diallylamine (I) and sulfur dioxide has a molecular weight of 2,800 to 200,000.

* * * * *